United States Patent [19]
Nyhus

[11] Patent Number: 6,131,849
[45] Date of Patent: Oct. 17, 2000

[54] ARTICULATING/TELESCOPING DUCT FOR REACTION DRIVE HELICOPTERS

[75] Inventor: Daniel A. Nyhus, Gilbert, Ariz.

[73] Assignee: McDonnell Douglas Helicopter Company, Mesa, Ariz.

[21] Appl. No.: 09/203,769

[22] Filed: Dec. 2, 1998

[51] Int. Cl.[7] .................................................. B64C 27/18
[52] U.S. Cl. ..................................... 244/17.11; 416/20 R
[58] Field of Search ............................... 244/6, 7 R, 7 A, 244/7 B, 17.11; 416/20 R, 20 A, 90, 102, 148; 285/302, 231–234

[56] References Cited

U.S. PATENT DOCUMENTS

| | | | |
|---|---|---|---|
| 2,454,040 | 11/1948 | Dalton | 416/20 A |
| 2,774,618 | 12/1956 | Alderson | 285/302 |
| 3,296,361 | 1/1967 | Markland et al. | 285/302 |
| 3,370,809 | 2/1968 | Leoni | 244/7 A |
| 4,054,306 | 10/1977 | Sadoff, Jr. et al. | 285/233 |
| 4,473,335 | 9/1984 | Henry | 416/20 A |
| 5,454,530 | 10/1995 | Rutherford | 244/7 A |

FOREIGN PATENT DOCUMENTS

| | | | |
|---|---|---|---|
| 1446212 | 6/1966 | France | 416/20 A |

*Primary Examiner*—Galen L. Barefoot
*Attorney, Agent, or Firm*—Bryan Cave LLP

[57] ABSTRACT

An articulating and telescoping duct is provided for use in a helicopter reaction drive flow path for ducting the exhaust and/or bypass gases from the aircraft engine into the flow ducts of the rotor blades. In a preferred embodiment the telescoping duct comprises a tubular member having a bead formed at each end. Each of the beads has an outside surface formed into a spherically curved sector that is centered radially about the axis of the tubular member. The receiving duct at one end comprises a complementary spherical bore that seals against and retains the spherical outside surface of the tubular member while permitting the tubular member to articulate relative to the receiving duct. The receiving duct at the other end comprises a complementary cylindrical bore that seals against the spherical outside surface of the tubular member while permitting the tubular member both to articulate relative to and telescope in and out of the cylindrical bore.

By incorporating an articulating and telescoping duct into the flow path of the reaction drive it is possible to route the exhaust gases from the engine to the rotor blades with less total duct length and with fewer bends than was heretofore possible, thereby reducing the total losses associated with the ducting with a concomitant increase in aircraft efficiency.

7 Claims, 3 Drawing Sheets

ARTICULATING/TELESCOPING DUCT FOR REACTION DRIVE HELICOPTERS

BACKGROUND OF THE INVENTION

This invention relates generally to helicopter and rotor/wing aircraft and more specifically to such aircraft having reaction drive rotor blades.

Conventional helicopter aircraft typically comprise a plurality of rotor blades attached to a rotor at the top of the helicopter fuselage. The rotor is supported by a main shaft that is driven by a prime mover such as a conventional gas turbine engine operating through a transmission. The transmission typically comprises multiple stages of gears necessary to reduce the high speed low torque shaft output of the turbine engine into a low speed high torque shaft output necessary to drive the rotor. The weight associated with the transmission of a conventional helicopter limits the total payload achievable by conventional helicopters. This is especially true in the case of large, heavy lift helicopters. Moreover, the torque reaction caused by the rotor blades against the main shaft necessitates a substantial tail rotor or tail thruster to provide the antitorque control necessary to maintain the yaw attitude of a conventional helicopter, which also reduces fuel efficiency and the total power available to carry payload.

Accordingly, it has been suggested that the overall efficiency of very large helicopters and especially dual mode rotor/wing aircraft that fly predominantly in a fixed wing mode (such as the rotor/wing aircraft disclosed in U.S. Pat. No. 5,454,530, incorporated herein by reference) may be improved through the use of a reaction drive mechanism to drive the main rotor of such aircraft. In a preferred embodiment of a reaction drive mechanism, a flow of exhaust and/or bypass gases from a turbine engine are ducted through the rotor blades to exit from one or more nozzles at the trailing edges of the blade tips. Because the blades are caused to rotate about the fuselage by the mass flow rate of the exhaust gases exiting the blade tips, rather than by the exertion of a torque about the rotor main shaft, very little antitorque control is needed to maintain the yaw attitude of the aircraft.

As may be ascertained from the foregoing, because the primary lift mechanism of a reaction drive helicopter involves the ducting of the main engine exhaust from the main engine, through the rotor and into the rotor blades, it is imperative that the ducting be as short and smooth as possible and as free of bends and abrupt entrances and exits so as to minimize the pressure losses associated with the internal flow through the ducting.

SUMMARY OF THE INVENTION

The present invention comprises an articulating and telescoping duct for use in a helicopter reaction drive flow path. In a preferred embodiment the telescoping duct comprises a tubular member having a bead formed at each end. Each of the beads has an outside surface formed into a spherically curved sector that is centered radially about the axis of the tubular member. The receiving duct at one end comprises a complementary spherical bore that seals against and retains the spherical outside surface of the tubular member while permitting the tubular member to articulate relative to the receiving duct. The receiving duct at the other end comprises a complementary cylindrical bore that seals against the spherical outside surface of the tubular member while permitting the tubular member both to articulate relative to and telescope in and out of the cylindrical bore.

By incorporating an articulating and telescoping duct into the flow path of the reaction drive it is possible to route the exhaust gases from the engine to the rotor blades with less total duct length and with fewer bends than was heretofore possible, thereby reducing the total losses associated with the ducting with a concomitant increase in aircraft efficiency.

BRIEF DESCRIPTION OF THE DRAWING

The present invention will be better understood from a reading of the following detailed description, taken in conjunction with the accompanying drawing figures in which like references designate like elements and, in which.

DETAILED DESCRIPTION

Figure 1:
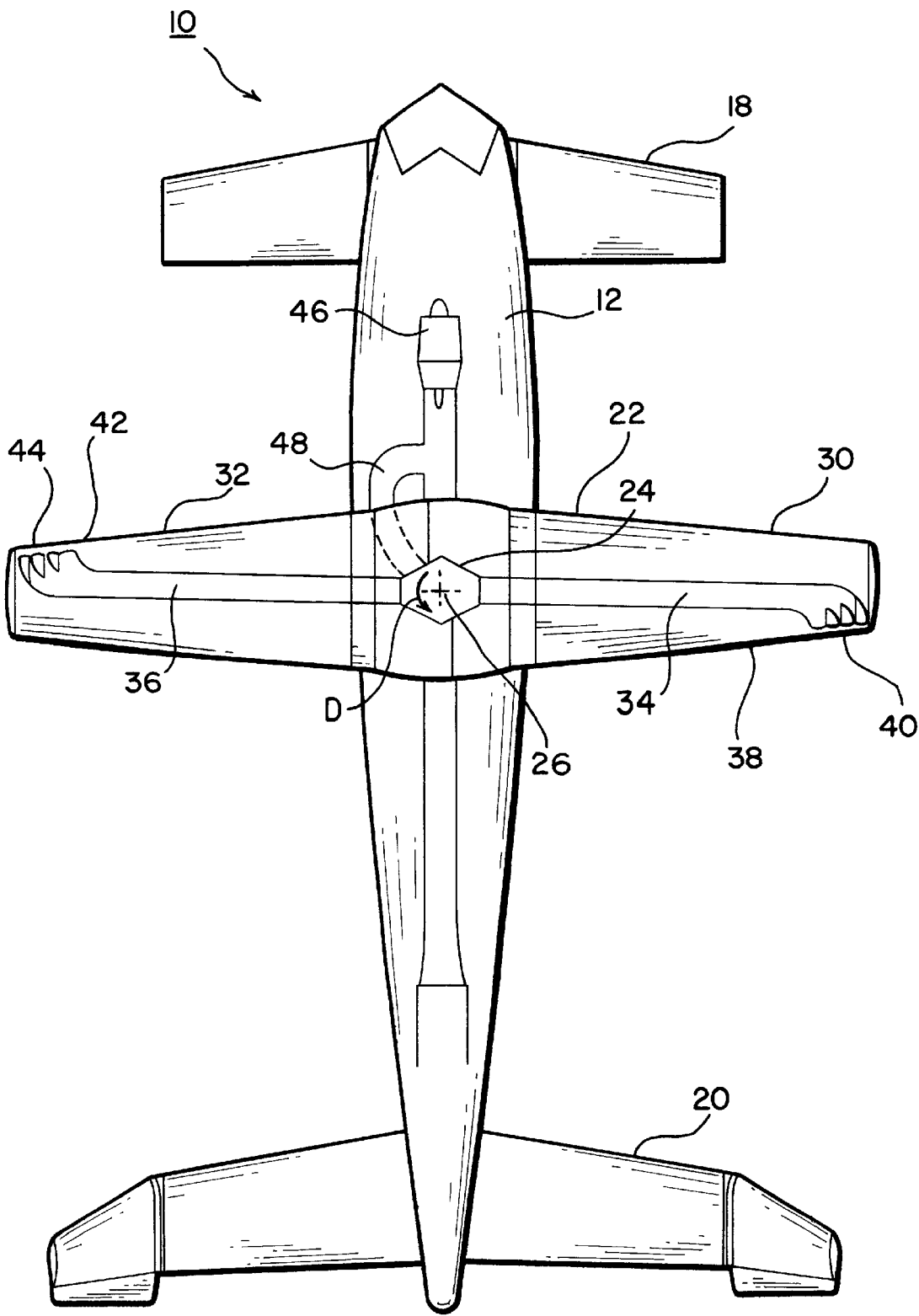
FIG. 1 is a diagrammatic top plan view of a rotor/wing aircraft that may advantageously incorporate an articulating/telescoping duct in accordance with the present invention.

The drawing figures are intended to illustrate the general manner of construction and are not necessarily to scale. In the description and in the claims the terms left, right, front and back and the like are used for descriptive purposes. However, it is understood that the embodiment of the invention described herein is capable of operation in other orientations than is shown and the terms so used are only for the purpose of describing relative positions and are interchangeable under appropriate circumstances.

FIG. 1 is a diagrammatic plan view of a rotor/wing aircraft that may advantageously incorporate an articulating/telescoping duct in accordance with the present invention. Aircraft 10 comprises a fuselage 12. Fuselage 12 supports a front canard 18, a rear lifting tail 20, and a rotor/wing 22. Rotor/wing 22 comprises a rotor hub 24 which, in helicopter mode, rotates in a direction "D" about an azimuthal axis 26. Attached to and extending radially outward from rotor hub 24 are rotor blades 30 and 32. Rotor blades 30 and 32 each contain a flow duct 34 and 36. Flow duct 34 terminates at the trailing edge 38 of rotor blade 30 in a plurality of exit nozzles 40. Similarly flow duct 36 terminates at the trailing edge 42 of rotor blade 32 in a plurality of exit nozzles 44. The aircraft is powered by one or more turbine engines 46, the exhaust gases of which are ducted through ducting 48 contained within the fuselage 12. From there, the gases are ducted into flow ducts 34 and 36 to exit through exit nozzles 40 and 44. The mass flow of gases exiting exit nozzles 40 and 44 causes a reaction force to act against blades 30 and 32, which causes the blades to rotate about azimuthal axis 26. As with a conventional helicopter, the longitudinal and lateral rotor blade cyclic pitch control as well as the collective rotor blade pitch are transmitted to the rotor blades by means of a rotor blade swashplate mechanism acting on pitch links attached to the leading edges of blades 30 and 32. Because aircraft 10 incorporates a two bladed rotor, it is not necessary for rotor blades 30 and 32 to be fully articulated for independent motion in both the flapping and lead/lag degrees of freedom relative to azimuthal axis 26.

Accordingly, rotor hub 24 is of the teetering hub variety which allows for complementary motion of rotor blades 30 and 32 in the flapping and lead/lag degrees of freedom.

Figure 2:
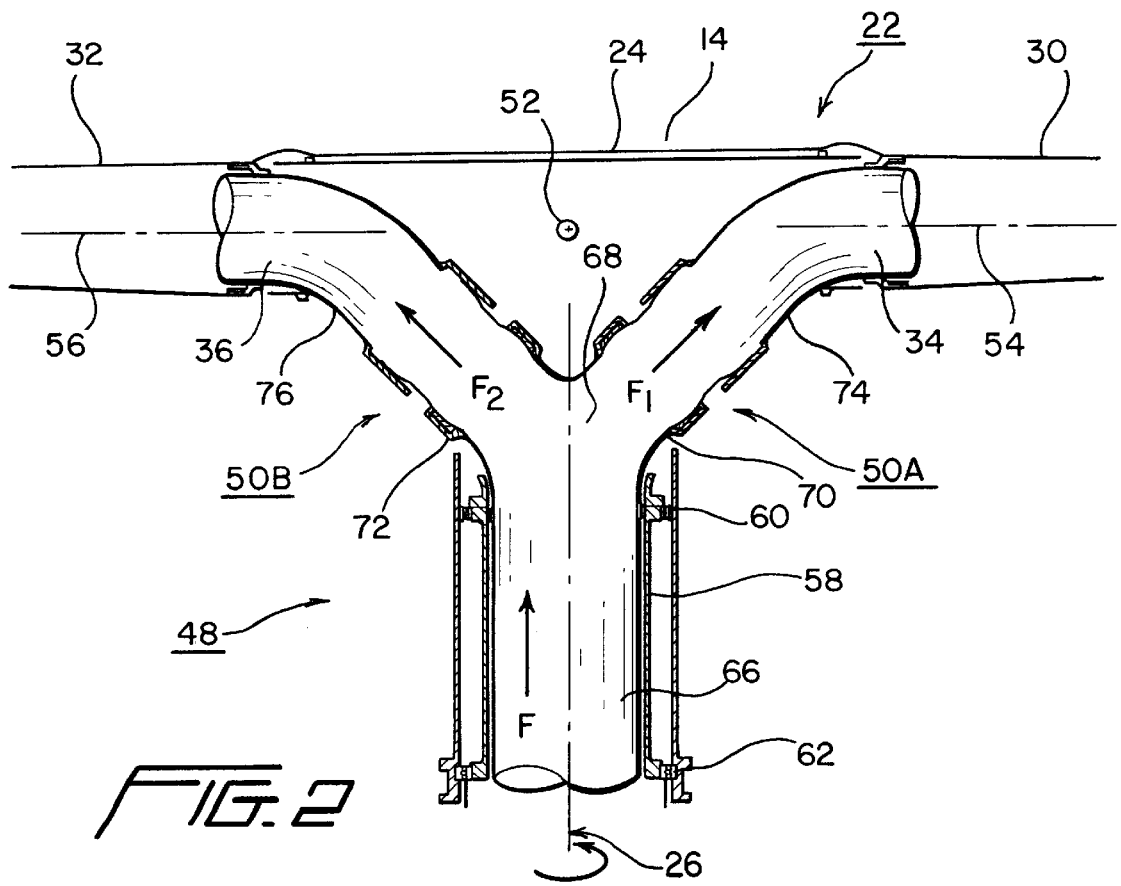
FIG. 2 is cross sectional view of a rotor/wing assembly incorporating an articulating/telescoping duct in accordance with the present invention shown with the teetering hub at zero teeter angle.

FIG. 2 is a partial cross section of a rotor wing assembly 22 comprising a pair of articulating telescoping duct assemblies 50A and 50B incorporating features of the present invention. Rotor wing 22 comprises rotor blades 30 and 32 each of which is supported for rotation about azimuthal axis 26 by a rotor hub 24. Rotor blades 30 and 32 are also independently pivotable about their respective pivot axes 54 or 56 in response to the collective, longitudinal cyclic, and lateral cyclic rotor blade pitch control inputs in a conventional manner well known in the art. Rotor hub 24 is supported in fuselage 12 by means of a rotatable mast 58 supported by a radial bearing 60 and a radial/thrust bearing 62 to allow rotor hub 24 to spin relative to fuselage 12 while providing axial constraints to enable rotor/wing 22 to fully support fuselage 12 when aircraft 10 is operating in a helicopter mode of flight. Rotor hub 24 comprises a conventional teetering hub which rigidly supports rotor blade 30 relative to rotor blade 32 in the flapping direction but permits the entire rotor/wing 22 to teeter as a rigid body about a teetering axis 52.

Ducting 48, which conveys the exhaust and/or bypass gases from engine 46 to flow ducts 34 and 36 comprises a lower conduit 66 having a "y" junction 68, which divides the flow F into two components F1 and F2, which flow through the two output conduits 70 and 72. Each portion of the divided flow passes through a substantially identical articulating telescoping duct 50A and 50B and enters into one of two input conduits 74 and 76, which in turn lead to flow ducts 34 and 36, respectively.

Figure 3:
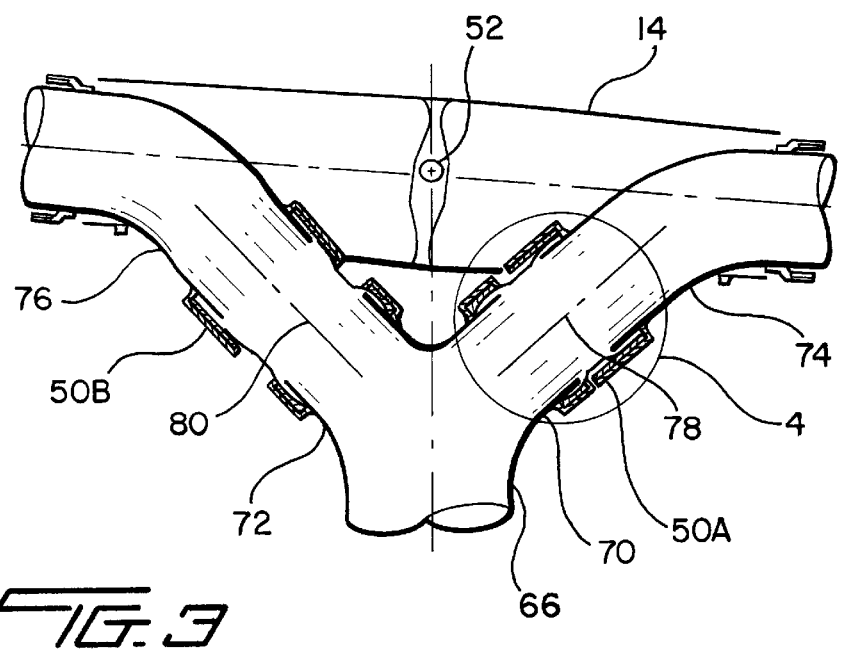
FIG. 3 is cross sectional view of a rotor/wing assembly incorporating an articulating/telescoping duct in accordance with the present invention shown with the teetering hub at maximum teeter angle.

As shown in FIG. 3, as rotor/wing 22 teeters about teetering axis 52, the alignment between lower conduit 66 and input conduits 74 and 76 changes. As shown in FIG. 3, teetering axis 52 is offset from the centerlines 78 and 80 of the output conduits 70 and 72. Accordingly, the rotation of rotor/wing 22 about axis 52 results in both rotation and translation of input conduits 74 and 76 relative to output conduits 70 and 72. Accordingly, the illustrative embodiment incorporates a pair of articulating telescoping ducts 50A and 50B capable of accommodating the relative rotation and translation from the fully collapsed and pivoted downward position depicted by articulating telescoping duct 50A in FIG. 3 to the fully extended and pivoted upward position depicted by articulating telescoping duct 50B in FIG. 3.

Figure 4:
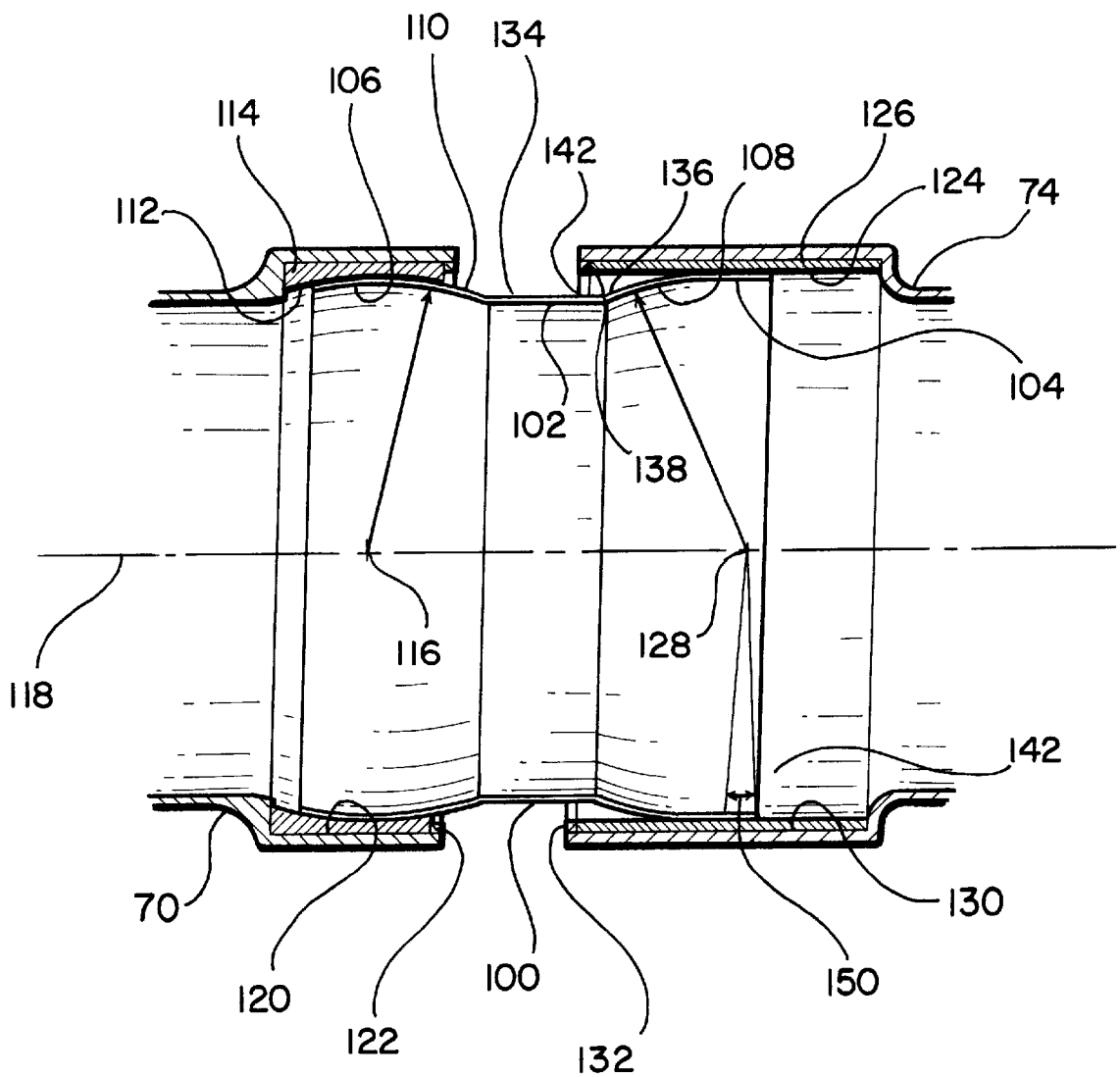
FIG. 4 is an enlarged cross sectional view of the articulating/telescoping duct of FIG. 2.

FIG. 4 is an enlarged cross section of articulating telescoping duct 50A of FIG. 2 and 3. Duct 50A comprises an intermediate tubular member 100 comprising a cylindrical throat 102 and having formed at the ends thereof a pair of beads 104 and 106 the outer surfaces 108 and 10 of which comprise substantially spherical sectors. Outer surface 110 of bead 106 slidingly engages inner surface 112 of seal insert 114. Inner surface 112 comprises a spherical sector forming a complementary spherical surface to surface 110. As used herein, complementary spherical surface means that inner spherical surface 112 has a diameter equal to or slightly smaller or larger than outer surface 110 such that the interface between outer surface 110 and inner surface 112 forms a relatively gas-tight seal while still permitting intermediate tubular member 100 to pivot about the center 116 of spherical surface 110—i.e. along a polar axis of tubular member 100. Because of the high temperature of the gases being conveyed by ducting 48, intermediate tubular member 110 is preferably composed of a metal alloy and seal insert 114 is preferably composed of carbon. To aid in assembly, seal insert 114 may be split into two halves along a plane through axial centerline 118. The two halves of seal insert 114 may then be assembled over bead 106 with their mating surfaces along the plane through axial centerline 118 and the assembly inserted into a cylindrical bore 120 formed in output conduit 70. Seal insert 114 is then retained by conventional means such as a roll crimp or, as shown in FIG. 4, a circlip 122 engaging cylindrical bore 120. Other conventional means of forming a carbon seal over a spherical bead, such as by forming the bead after inserting the intermediate tube 100 into the seal insert 114 may also be used within the scope of the present invention.

Outer surface 108 of bead 104 slidingly engages inner surface 124 of seal insert 126. Inner surface 124 comprises a complementary cylindrical surface to the spherical outer surface 108 of bead 106. As used herein, complementary cylindrical surface means that inner cylindrical surface 124 has a diameter equal to or slightly smaller or larger than outer surface 108 such that the interface between outer surface 108 and inner surface 124 forms a relatively gas-tight seal while still permitting intermediate tubular member 100 both to pivot about the center 128 of spherical surface 108 and to telescope axially in and out of cylindrical seal insert 126. As with seal insert 114, because of the high temperature of the gases being conveyed, seal insert 126 is preferably composed of carbon. As with seal insert 114, seal insert 126 may be inserted into a cylindrical bore 130 formed in input conduit 74 and then retained by conventional means such as a roll crimp or, as shown in FIG. 4, a circlip 132 engaging cylindrical bore 130.

Because the sealing engagement of spherical surface 108 with cylindrical surface 124 is theoretically a line contact, the spherical sector subtended by surface 108 must be at least twice the expected angular misalignment of intermediate tube 100 with respect to input conduit 74 and if the minimum spherical sector is used, it must be axially symmetric about center 128, as shown by the arc indicated as 150 in FIG. 4 Because tubular member 100 dynamically telescopes in and out of cylindrical seal insert 126 as rotor wing 14 teeters, however, the spherical sector subtended by surface 108 must be greater than that of arc 150. This is because the geometry dictates that outer surface 134 of throat 102 must be sized smaller than an equivalent static or non-telescoping seal so that tube outer surface 134 of throat 102 does not does not come in contact with cylindrical surface 124 or any part of input conduit 74. To illustrate, if intermediate tubular member 100 is extended such that apex 136 is substantially aligned axially with opening plane 138 of input conduit 74, intermediate tubular member 100 will be rotated through a given angle about center 128 before apex 136 comes in contact with input conduit 74. Intermediate tubular member 100 will, however, be rotated through a smaller angle about center 128 when intermediate point 140 (which is aligned with opening plane in FIG. 4) comes into contact with input conduit 74. The smaller angle produces the same displacement because the radius from center 128 to apex 136 is smaller than the radius from center 128 to intermediate point 140. In order to accommodate the smaller outer diameter 134 dictated by the foregoing considerations, the arc of spherical surface 108 must be extended substantially beyond arc 150 to meet diameter 134 as shown in FIG. 4. The foregoing geometry considerations are not involved at the mouth end 142 of bead 104. Accordingly, the spherical sector comprising bead 104 may be, but need not be symmetrically disposed about center 128 of spherical surface 108 and as shown in FIG. 4 may be substantially asymmetrical.

With respect to the spherical seal at bead 106, since the contact between outer surface 110 and inner spherical surface 112 comprises a sphere to sphere seal rather than a sphere to cylinder seal, more than a theoretical line contact is possible. Accordingly, surface 110 need only extend as far from outer surface 134 as is necessary to meet inner surface 112 of seal insert 114 and form a gas tight seal therewith. Therefore, outer surface 110 may also be asymmetrically disposed about center 116 of outer surface 110.

Although it would be possible to reverse the locations of the complementary spherical surfaces 110 and 112 with the complementary cylindrical/spherical surfaces 124 and 108, it should be observed that from a frame of reference of fuselage 12, output conduits 70 and 72 rotate about azimuthal axis 26 but do not teeter about teetering axis 52 whereas input conduits rotate about azimuthal axis 26 and teeter about teetering axis 52. If the position of the complementary surfaces were reversed, intermediate tubular member 100 would constrained to rotate about input conduits 74 and 76 and, therefore would be subjected to the reversing cycles of acceleration to which input conduits 74 and 76 are subjected. Thus, in the illustrative embodiment, the end of intermediate tubular member 100 having complementary spherical sectors 110 and 112, which constrain tubular member 100 in the axial direction, is formed at the end nearest output conduits 70 and 72 such that tubular member 100 is not subjected to the reversing cycles of acceleration. Additionally, given that the flow direction is from the rotating output conduits 70 and 72 to the rotating teetering input conduits 74 and 76, an added benefit is that the spherical seal is at the upstream end while the line contact spherical/cylindrical seal is at the downstream end, which makes the joint less susceptible to leakage.

As illustrated by the foregoing, incorporation of an articulating telescoping duct into the ducting leading from the engine to the flow ducts in the rotor blades permits the gases to be directed from a vertical lower conduit into the radially extending flow ducts of a plurality of pivotable rotor blades with only one total bend of approximately ninety degrees. The reduction of the flow path to a single ninety degree bend provides a substantial improvement in terms of major and minor pressure losses over the prior art methods which involved as many as three bends of between 45 and 135 degrees.

Although certain preferred embodiments and methods have been disclosed herein, it will be apparent from the foregoing disclosure to those skilled in the art that variations and modifications of such embodiments and methods may be made without departing from the spirit and scope of the invention. For example, although the illustrative embodiment depicts a two bladed teetering hub, an articulated/telescoping duct in accordance with the present invention would be equally applicable to a reaction drive helicopter incorporating fully articulated blades. Accordingly, it is intended that the invention shall be limited only to the extent required by the appended claims and the rules and principles of applicable law.

What is claimed is:

1. A reaction drive apparatus comprising:
   a turbine engine having an exhaust outlet providing a source of pressurized gas;
   a rotor blade assembly comprising a rotor hub and a plurality of rotor blades, each of said plurality of rotor blades comprising an internal duct having an inlet and an exit nozzle; and
   a duct providing fluid communication between said exhaust outlet and one of said inlets, said duct comprising:
   a first fluid conduit;
   a second fluid conduit; and
   an intermediate fluid conduit comprising a tubular member disposed between said first and second fluid conduits, said intermediate fluid conduit comprising first and second ends and a longitudinal axis, said first and second ends each comprising a bead formed about said end, said beads each comprising an outer surface formed into a spherically curved sector radially disposed about said longitudinal axis;
   said first fluid conduit comprising a complementary spherical bore disposed about said first end, said complementary spherical bore cooperating with said first end to sealingly and pivotally retain said first end;
   said second fluid conduit comprising a complementary cylindrical bore disposed about said second end, said complementary cylindrical bore directly engaging said second end to slidably and pivotally engage said second end.

2. The reaction drive apparatus of claim 1, wherein:
   said first fluid conduit further comprises a first seal insert, said first seal insert comprising a generally cylindrical solid having a cylindrical outer surface defining a seal longitudinal axis and an inner surface defining said complementary spherical bore, said first seal insert being retained within a cylindrical bore disposed within said first fluid conduit.

3. The reaction drive apparatus of claim 2, wherein:
   said first seal insert comprises a first and second half, said first and second half each comprising a generally semi-cylindrical outer surface and a generally semi-spherical inner surface portion, said first and second halves comprising surfaces mating along a plane passing through said seal longitudinal axis.

4. The reaction drive apparatus of claim 2, wherein:
   said first seal insert comprises graphite.

5. The reaction drive apparatus of claim 1, wherein:
   said second fluid conduit further comprises a second seal insert, said second seal insert comprising a hollow cylindrical tubular member having an outer cylindrical surface and an inner cylindrical surface, said inner cylindrical surface defining said complementary cylindrical bore, said second seal insert being retained within a cylindrical bore disposed within said second fluid conduit.

6. The reaction drive apparatus of claim 5, wherein:
   said second seal insert comprises a graphite material.

7. A reaction drive apparatus for a rotating wing aircraft comprising:
   a turbine engine having an exhaust outlet providing a source of pressurized gas;
   a rotor blade assembly comprising a rotor hub and a plurality of rotor blades mounted thereto, said rotor hub and said plurality of rotor blades mounted for free rotation about an azimuthal axis of said rotating wing aircraft, said plurality of rotor blades each comprising an internal flow duct having an inlet and an exit nozzle; and ducting apparatus providing fluid communication between said exhaust outlet and said plurality of inlets, said ducting apparatus comprising:

a first conduit having an intake disposed symmetrically about said azimuthal axis and a plurality of outlets, said first conduit being mounted for synchronous rotation with said rotor hub; and a plurality of intermediate fluid conduits, each of said plurality of intermediate fluid conduits providing fluid communication between one of said first plurality of outlets and one of said plurality of inlets of said internal flow ducts, said plurality of intermediate fluid conduits mounted for pivoting about a polar axis relative to said first conduit and mounted for translation and pivoting about a polar axis relative to said one of said plurality of inlets, each of said plurality of intermediate fluid conduits comprising a tubular member having an outer surface comprising a spherically convex sector and each of said inlets comprising a complementary cylindrical bore, said spherically convex sector of said intermediate fluid conduit directly engaging said complementary cylindrical bore to provide an articulated and telescoping seal therebetween.

\* \* \* \* \*